Patented Sept. 28, 1943

2,330,713

UNITED STATES PATENT OFFICE 2,330,713

CHEMICAL COMPOUNDS AND PROCESS OF MAKING THE SAME

George E. Holbrook, Wilmington, Del., and Louis Spiegler, Woodbury, N. J., assignors to E. I. du Pont de Nemours & Company, Wilmington, Del., a corporation of Delaware No Drawing. Application December 9, 1940, Serial No. 369,350

5 Claims. (Cl. 260—372)

This invention relates to the preparation of water-soluble sulfo-aliphatic carboxylic acid amides. More particularly it relates to the preparation of water-soluble sulfoaliphatic carboxylic acid polynuclear amides which are useful as dyes. Still more particularly it relates to the preparation of water soluble carbonamides from insoluble amino polynuclear aromatic cyclic diketo compounds by condensation with saturated beta sulfo aliphatic carboxylic acid anhydrides. The invention also pertains to such water soluble products as new products and compositions.

This invention has for an object the preparation of new high molecular polynuclear cyclic diketone dyes. Another object is to provide a new method of solubilizing amino anthraquinones and related amino polynuclear aromatic diketo compounds. A still further object is to provide a new use for saturated beta sulfo aliphatic carboxylic anhydrides. Another object is to provide new dyes suitable for cellulose acetate, wool and nylon fibers. Another object is to produce such compounds and compositions in a simple and economical manner and in good yield. Still another object is to make a general advance in the art of dyes and solubilization of amino high molecular polynuclear cyclic diketo compounds. Still other objects will be apparent from the following description.

The above objects are accomplished by the following invention which in its broader aspects involves reacting an amino-high molecular polynuclear cyclic diketone compound with a saturated aliphatic beta sulfo carboxylic acid anhydride under amide forming conditions.

In a more limited sense, the invention comprises reacting an amino polynuclear cyclic ketone containing at least one cyclic ketone group including those taken from the group consisting of aminoanthraquinones, aminonaphthoquinones, aminodianthraquinonyls, aminobenzanthrones, aminoanthranthrones and aminopyrenequinones, with a saturated aliphatic beta-sulfo carboxylic acid anhydride in the substantial absence of water.

The aforedescribed amino polynuclear diketones may contain one or more amino groups and various other substituents which do not react with the anhydrides. Thus, the cyclic nuclei may contain hydrocarbon groups including alkyl groups, e. g. ethyl, methyl, isopropyl, butyl, aralkyl groups, e. g. benzyl, aryl groups, e. g. phenyl, chlorphenyl, tolyl, alkoxy groups, e. g. methoxy, ethoxy, halogen groups, e. g. chlorine, bromine, trifluormethyl, mono- and di-alkyl-amino, e. g. ethylamino, methylamino, mono- and diarylamino, e. g. phenylamino, etc.

The amino groups which are to be reacted to form the novel arylides of sulfo-aliphatic carboxylic acids should contain two hydrogen atoms attached to the nitrogen atom or atoms.

The novel and useful products produced have the general formula:

(1) 

wherein R is a polynuclear cyclic diketone radical or residue, $R_1$, $R_2$ and $R_3$ are hydrogen or hydrocarbon radicals and Y is hydrogen or a water-soluble salt forming group, e. g. alkali metal, ammonium, substituted ammonium or amine groups. Suitable groups include sodium, potassium, tetramethylammonium, tetraethylammonium, methylamino, ethylamino, dimethylamino, diethylamino, ethanolamino, diethanolamino, triethanolamino, etc.

The reaction is preferably carried out at low to moderate temperatures in the presence of an inert solvent or diluent. Thus, the amino polynuclear diketone compound may be dissolved in an inert organic solvent and admixed with an inert solvent solution of the aliphatic beta sulfo carboxylic acid anhydride. After a short period of standing or warming, the sulfo carboxy arylide forms and in most instances precipitates out as a solvent insoluble condensation product. The products so obtained are soluble in water and can be neutralized with salt forming compounds and crystallized out to form water-soluble salts. The aqueous solution can be used for dyeing fibers, e. g. cellulose derivatives, wool and nylon fibers directly.

Graphically the reaction may be illustrated as follows:

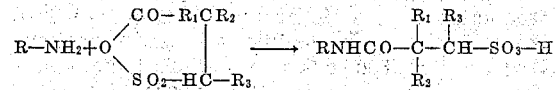

The invention shall be further illustrated but is not intended to be limited by the following examples wherein the parts stated are parts by weight:

Example I

Forty-eight parts of 1.4 diaminoanthraquinone are dissolved in 1500 parts of dioxane at 90–95° C. Next is added a solution of 38 parts of inner anhydride of beta sulfo propionic acid anhydride in 100 parts of dioxane over a period of 4–5 hours. The mixture is held at 90-95° C. until the color is fully precipitated which requires 4 to 5 hours. The solution is then cooled, filtered and the collected solids washed with fresh dioxane. The product can be dried, or can be dissolved directly in water or dilute alkali for use as desired.

*Example II*

Similarly 48 parts of 1-amino-4-hydroxy anthraquinone dissolved in 1500 parts of acetic acid are reacted with 40 parts of inner anhydride of beta sulfo propionic acid. The condensation product comes out almost immediately as a precipitate leaving the solvent colorless. The collected solids are filtered and washed with fresh acetic acid. The product can be dried, or it can be dissolved directly in water or dilute alkali for use as desired.

*Example III*

Twenty-seven parts of 1,4,5,8-tetramino anthraquinone is reacted with 20 parts of beta sulfo propionic acid anhydride in 1500 parts dioxane solution after the manner set forth in Example I and the solubilized product precipitated in a similar manner.

*Example IV*

Three parts 1-amino-4-anilino anthraquinone are dissolved in 100 parts of dioxane at 20° C. A clear colored solution is obtained. A solution of 2 parts of beta-sulfo propionic acid anhydride in dioxane is slowly added. The condensation product precipitates immediately, while the liquors become practically colorless. A temperature rise to 24° C. is noted. The product can be filtered from dioxane or dissolved directly into water for use as desired.

*Example V*

In a manner similar to that set forth in Example IV 3.5 parts of 1-amino-4 (meta methylol anilino) anthraquinone is rendered water soluble by condensation with 4 parts of beta-sulfo propionic acid anhydride, employing dioxane as solvent for the reactants.

*Example VI*

Two and one-half parts 1-amino-4-methylamino anthraquinone is condensed with 2 parts of beta-sulfo propionic anhydride to form an organic solvent insoluble product, which is suitable for dyeing Acele, nylon and wool fibers from water solution.

The beta sulfo aliphatic carboxylic acid anhydrides which are useful in carrying out the above solubilization reactions can be made by reacting a saturated aliphatic carboxylic acid compound having at least two carbon atoms in a chain attached to the carbonyl group with sulfuryl chloride under conditions which promote the introduction of a sulfo group (—$SO_2$—O—) into the carbon nucleus. Actinic light, more particularly light of 1800 to 7000 Å., especially light predominating in wave lengths of 3000 to 5000 Å., and an organic catalyst such as an amine especially N-heterocyclic amines are conducive of the reaction. It should be carried out in the absence of substantial amounts of water and preferably under anhydrous conditions. Any beta sulfocarboxylic acids formed due to the presence of minor amounts of water, can be converted into anhydrides by reaction with strong dehydrating agents such as thionyl chloride, phosphorus trichloride, phosphorus pentachloride, etc. Sulfocarboxylic acids obtained by other processes can be similarly converted to anhydrides.

Suitable conditions and reactants for carrying out the reactions just described are set forth in an application of M. S. Kharasch entitled "Preparation of sulfo compounds" Ser. No. 369,353, filed upon an even date herewith. The sulfo aliphatic carboxylic anhydrides so prepared have the general formula:

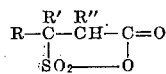

wherein R, R' and R" are each hydrogen or alkyl radicals. Beta sulfo propionic acid anhydride so formed is an extremely hygroscopic solid having a melting point of 76 to 77° C., which is insoluble in ligroin, benzene and chloroform, but soluble in water and alcohol. Beta sulfo-isobutyric inner anhydride is a yellow viscous liquid insoluble in ligroin having a B. P. at 3 to 5 mm. of mercury pressure of 135–145° C.

The processes of the present invention and the solubilized compounds obtained therefrom are not limited to the use of sulfo propionic acid inner anhydride as set forth in the preceding examples. On the contrary, beta-sulfo-isobutyric acid inner anhydride, beta-sulfo-normal butyric acid inner anhydride and a variety of other anhydrides can be used, e. g. inner anhydrides from beta sulfo saturated aliphatic carboxylic acids such as valeric, caproic, decoic, lauric, myristic, palmitic, margaric and stearic. Mixtures of one or more of the herein described acids may be used. Mixtures of acids such as are obtained by the hydrolysis of natural oils, fats and waxes, e. g. glycerides; mixtures of acids obtained by the oxidation of saturated aliphatic hydrocarbons, petroleum oils and waxes, also have utility. Unsaturated acids such as oleic, which contain a majority of saturated linkages can be similarly reacted.

The reactants may be used in various proportions. In general at least 1 mol of the inner anhydride is used for one amino group of the amino polynuclear cyclic diketone. At least one mol for each amino group can be used. An excess over that theoretically necessary to react with each amino group can be used.

While dioxane and acetic acids are the only solvents mentioned in the specific examples, a large number of others can be substituted with similar results. Suitable additional solvents include aliphatic ethers, e. g. dimethyl ether, diethyl ether, etc., hydrocarbons, e. g. benzine, ligroin, pentane, benzene, toluene, xylene, chlorobenzene, nitrobenzenes, etc. The amount of solvent used may vary over a wide range. In general sufficient solvent should be present to dissolve each of the reactants. A large excess of solvent in most cases should be avoided to insure a condensation product free from water insoluble starting materials. Solvents are not essential to the reaction. The reactions can take place by fusion, particularly when the ketone has a melting point close to that of the anhydride.

The temperature is not limited to the range of 20 to 100° C. described in the examples, although that represents a practical range. Temperatures of 0° C. and below to those in excess of 250° C. and higher can be used, depending somewhat on the particular amino polynuclear diketone, beta sulfo aliphatic carboxylic acid inner anhydride and solvent used. In general, high boiling solvents or pressures in excess of atmospheric pressure should be used at the higher temperatures. Subatmospheric pressure in some instances can be used.

The amino polynuclear cyclic diketones above-described can be substituted with various atoms or groups such as hydrocarbon radicals including normal-, secondary-, tertiary-, iso- and branched chain alkyl, e. g. methyl, ethyl, isopropyl, secondary butyl, tertiary butyl, 2-methyl pentyl, etc.; aryl, e. g. phenyl, chlorphenyl, naphthyl, etc., cycloalkyl, e. g. cyclohexyl, methylcyclohexyl, etc.; halogen, e. g. chlorine, bromine, $CF_3$, nitro, nitrile, carboxyl and carboxy ester groups.

It will be readily apparent to those skilled in the art that this invention has considerable utility and many advantages. Thus, it provides a simple and effective method of converting insoluble amino polynuclear cyclic diketones into water soluble products. It adds a class of new and useful compounds to the art. It provides a new use for sulfo aliphatic carboxylic acid anhydrides.

The solubilized compounds and especially the solubilized amino anthraquinone products are highly colored, and form deep red to blue-green water solutions which are useful for dyeing cellulose acetate, wool, nylon and other natural, chemically modified and synthetic fibers, filaments, skeins, hanks, yarns, threads and fabrics.

The following dyeing procedures further illustrate the utility of the invention.

*Procedure A (cellulose actate fabrics)*

Disperse a small amount, e. g. 100 mg. of one of the dyes in the above examples with a small amount of an aqueous soap solution, e. g. 1 cc. of a 10% solution and add enough water to bring the total up to 200 cc. Add a small piece of cellulose acetate fabric, e. g. 5 grams, and heat at about 180° F. for about 1 hour. Rinse well in warm water. The fabric shows good strength and uniformity.

*Procedure B (nylon fabrics)*

Dissolve one of the above dyes in an aqueous solution in an amount similar to that described in Procedure A, and bring the volume up to 200° C. Immerse a small piece of nylon fabric, e. g. a 5 gram square in the dye solution for a period of about one hour while maintaining a temperature of about 180° F. to 190° F. Small amount of a dilute mineral acid, e. g. hydrochloric or an organic, e. g. acetic, may be added. A uniformly dyed print of good strength results.

*Procedure C (wool fabric)*

An amount of one of the above dyes similar to that set forth in Procedure A was added to a hot water solution of a volume 40-1. Glauber's salts and a small amount of sulfuric acid was added. A wool cloth was added to the dye bath which was maintained at a boil for ½ hour. A second portion of acid was added and dyeing continued for another half hour. Wash and dry. A uniformly dyed product results.

The dyeings possess shade, exhaustion and fastness properties which are similar to those obtained from the free amine dyed from dispersions in a soap bath. Furthermore, the dyeings on wool are level and compare favorably with those obtained from sulfonated amino anthroquinones in shade, wash, light and perspiration fastness.

As many apparently widely different embodiments of this invention may be made without departing from the spirit and scope thereof, it is to be understood that I do not limit myself to the specific embodiments herein except as defined by the appended claims.

We claim:

1. The process which comprises reacting a primary amino anthraquinone with a beta-sulfo propionic anhydride at a temperature between 20° C. and 100° C. in the substantial absence of water and recovering a sulfo carboxylic acid amide.

2. The process which comprises reacting a primary amino anthraquinone with a beta sulfo saturated aliphatic carboxylic acid inner anhydride of 2 to 6 carbon atoms at a temperature between 20° C. and 100° C. in the substantial absence of water and recovering a sulfo carboxylic acid amide.

3. The compounds having the general formula:

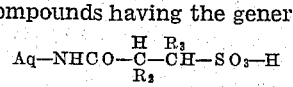

wherein Aq is an anthraquinone radical which is attached to the amido group through a carbocyclic carbon atom, one of the R's is hydrogen and the other alkyl.

4. The compounds having the general formula:

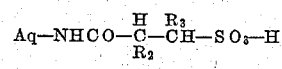

wherein Aq is an anthraquinone radical free from groups other than amino groups which react with anhydrides which is attached to the amide group through a carbocyclic carbon atom, one of the R's is hydrogen and the other alkyl.

5. The compounds having the general formula:

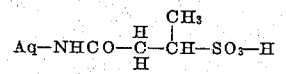

wherein Aq is an anthraquinone radical free from groups other than amino groups which react with anhydrides which is attached to the amino group through a carbocyclic carbon atom.

GEORGE E. HOLBROOK.
LOUIS SPIEGLER.